US006389149B1

(12) United States Patent
Liu

(10) Patent No.: US 6,389,149 B1
(45) Date of Patent: May 14, 2002

(54) METHOD AND APPARATUS TO IMPROVE VIDEO PROCESSING IN A COMPUTER SYSTEM OR THE LIKE

(75) Inventor: Andrew Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/002,134

(22) Filed: Dec. 31, 1997

(51) Int. Cl.[7] .................................................. G06K 9/00
(52) U.S. Cl. ........................ 382/100; 345/501; 345/502
(58) Field of Search ................................ 382/100, 307; 345/501, 502, 503, 520, 522; 712/1, 10

(56) References Cited

U.S. PATENT DOCUMENTS 5,121,436 A 6/1992 Kasdan et al. ................. 382/6
5,335,321 A 8/1994 Harney et al. .............. 395/162
5,517,612 A 5/1996 Dwin et al. ................. 395/166
5,721,835 A 2/1998 Niwa et al. ................. 395/281
5,903,261 A 5/1999 Walsh et al. ................ 345/302

*Primary Examiner*—Matthew C. Bella
(74) *Attorney, Agent, or Firm*—Kenyon & Kenyon

(57) ABSTRACT

An improved method and apparatus for processing video data is provided. A video subsystem generates first and second fields of video image data. First fields of video image data need not be sent over a common bus, but instead can be sent over a port connection (such as the Zoom Video port connection) to the graphics subsystem for display. Second fields of video image data can be sent over the bus to a processor subsystem for compression and eventual transmission to a remote user via a modem or the like. Because the video subsystem generates first and second fields of video image data (e.g., an even and odd field for each frame), the video image data for local display need not be sent over the bus to the processor subsystem and need not be converted by the processor subsystem. This results in a savings in bus usage and processor execution needs.

24 Claims, 6 Drawing Sheets

METHOD AND APPARATUS TO IMPROVE VIDEO PROCESSING IN A COMPUTER SYSTEM OR THE LIKE

BACKGROUND OF THE INVENTION

The present invention pertains to a method and apparatus for improving video processing in a computer system or the like. More particularly, the present invention pertains to a method and apparatus for combining video throughput enhancement features into a single computer architecture.

Computer systems are increasingly being used for the capture and display of video images (e.g., in video phone/conferencing applications). An example of a bus architecture for a laptop computer system is shown in FIG. 1. A processor 1 (e.g., a PENTIUM® processor manufactured by Intel Corporation, Santa Clara, Calif.) is coupled to a bus 12. Bus 12 allows communication between processor 11 and a plurality of other components such as graphics subsystem 13 which in turn is coupled to a display 14 (e.g., an active matrix display). Also coupled to bus 12 is a PCMCIA (Personal Computer Memory Card International Association, Release 2.0, September 1991) bridge circuit 15. PCMCIA bridge circuit 15 is coupled to a number of insertable/removable peripheral components via ports 16*a*, 16*b*.

For video applications, a video capture card 17 can be coupled to PCMCIA bridge circuit 15 via port 16*a*, for example. With the video capture device, a camera 18, for example, generates a video input signal and the video capture device generates video image data. In its raw, uncompressed form, the video image data is typically presented as 30 "frames" per second by video capture card 17. In actuality, each frame comprises odd and even "fields," where an odd field represents odd numbered scan lines for the display 14 and the even field represents even numbered scan lines for display 14. In typical video capture devices for computer applications, one of the fields (e.g., the odd field) is not used and is discarded by video capture card 17.

Bus 12 will have certain bandwidth restrictions, as well. A video output that comprises 320 picture elements ("pixels") by 240 pixels for 30 fields per second where each pixel is represented by a two byte value (i.e., 16 bits) requires a bandwidth of 36.884 million bits per second on the bus. To reduce the impact on bandwidth for the bus, video capture card 17 could compress the video image data prior to placing it on the bus. An example of such a product is the CaptureVision PCMCIA card (Nogatech, Inc., Cupertino, Calif.). This PCMCIA card includes a digital signal processor (DSP) which compresses the video image data using any of a variety of compression techniques (e.g., MPEG-I and MPEG-II, International Organization for Standardization/International Electrotechnical Commission (ISO/IEC) 11172-2 and 13818-2). This PCMCIA card, which could be inserted in slot 16*a*, compresses the video image data from camera 18 and sends the data to processor 11. Processor 11 then acts on the compressed data to decompress this data and transfer it to the graphics subsystem 13 over bus 12 which then outputs the video image to the user at display 14. In a video phone application, processor 11 will also act to convert the same video image data into a form for transfer over a network 20 (e.g., a telephone system such as plane old telephone system—POTS) to another user (e.g.,"User B" 21) via a modulator/demodulator (modem) 19. Processor 11 also acts to convert the video image data from User B 21 over network 20 into a form for display by graphics subsystem 13. A typical network protocol for transmitting such information over network 20 is the H.261 (International Telecommunication Union—Telecommunications Standardization Sector (ITU-T), March, 1993) standard and the H.263 (ITU-T, Dec. 5, 1995) standard. Processor 11 works on this information to convert it once again into a form that can be transferred over bus 12 to graphics subsystem 13 and to the display 14.

There are two basic drawbacks to PCMCIA cards of this type. The first drawback is that these cards are expensive, in part because of the digital signal processor component. The second drawback is that the operation of the DSP works to slow down the overall system because of the time that is needed to compress data.

One system to increase throughput of video image data is an extension to the PCMCIA standard that provides a so-called Zoom Video port connection. Referring to FIG. 2, a standard Zoom Video system is shown. Again, a processor 31 is coupled to a bus 33 to which is coupled a graphics controller 34 (e.g., a 65554 or 65555 graphics controller from Chips and Technology, Inc.) and the rest of a graphics subsystem 35. In this example, bus 33 operates according to the Peripheral Component Interconnect (PCI) standard (Rev. 2.1, PCI Special Interest Group, Hillsboro, Oreg., 1995). A video capture card 39 is coupled to a PCMCIA interface, which in turn is coupled to the PCI bus. If the video capture card 39 operates according to the Zoom Video extension, a Zoom Video Bus/port 37 is provided that is coupled between video capture card 39 and the graphics controller chip of the graphics subsystem. The execution of a software driver (e.g., stored in memory 41) operates as an interface between processor 31 and the PCMCIA bridge 43 as well as graphics controller 34. Using the software driver, the PCMCIA bridge can receive a command causing it to be placed in a so-called tri-state mode of operation, and video image data output by video capture card 39 (from camera 40) are not processed by PCMCIA bridge 43 (i.e., not placed onto the PCI bus 33). Instead, the Zoom Video Bus/Port 37 ID carries the video data signals from video capture card 37 directly to graphics controller 34 and on to the graphics subsystem 35 to display 36. Though the Zoom Video system can handle 30 frames per second (60 fields per second) in video data, such a system is not effective for processor 31 which does not see the information that is being sent over the Zoom Video bus/port 37. This is do, in part, to the fact that graphics controller 34 tends to be a one-way device (i.e., data generally flows from the PCI bus 33 and Zoom Video bus/port 37 to the graphics subsystem 35 rather than vice versa).

As described above, the Zoom Video bus/port bypasses the PCI bus since no data is sent on the bus and instead passes as a "side band" signal. To increase the amount of data that can be transmitted to/from peripheral devices (such as a video capture card), the Cardbus interface standard was developed (now part of the PC Card interface; March 1997 release from PCMCIA). An example of a video-conferencing system that uses the Cardbus system is shown in FIG. 3. Processor 51 once again is coupled to bus 55 operating according to the PCI standard. The bus is further coupled to a modem 57, a graphics subsystem 58 which includes a graphics controller 59, and a PC Card bridge 60. An example of a PC card bridge would be the PCI 1130 bridge from Texas Instruments, Inc. (Dallas, Tex.). PC card bridge 60 serves as an interface to the PCI bus 55 for peripheral components coupled to slots 61*a* and 61*b*. PC Card bridge 60 serves as a PCMCIA interface (a 16-bit interface such as component 43 in FIG. 2) and also as a Cardbus interface (a 32-bit interface) depending on the type of component inserted into slots 61_a_ and 61_b_. A video capture device 63 operating according to the Cardbus interface can be inserted into slot 61_a_. An example of such a device is the Noteworthy Cardbus video capture card from Toshiba America Information Systems, Inc. In operation, the Noteworthy Cardbus video capture card converts video input signals from camera 65 into video image data that are passed through PC Card bridge 60, using the Cardbus standard, and onto PCI bus 55. As in the other systems described above, only one of the fields (odd or even) is sent while the other is typically discarded. Processor 51 then acts to compress these video data signals as described above and send the appropriate image to modem 57 for transmission to a second User (e.g., User B 67 coupled to network 66). Processor 51 then may also take the video data signals and convert them into a form for display. Processor 51 then sends these converted video data signals over PCI bus 55 to graphics subsystem 58 for display to the user (e.g., at display 68). Two additional accesses to PCI bus 55 would be necessary in a video conferencing application. Compressed video data from User B 67 received at modem 57) is decompressed by processor 51 after it is received over bus 55 and then the decompressed data is sent to graphics subsystem 58 after it is decompressed by processor 51.

Using the Noteworthy Cardbus video capture card in a video-conferencing application, five separate bus transactions are necessary to handle the transmission and receipt of video image data. Though PCI bus 55 can handle 132 Megabits/sec data throughput, other accesses to the bus may be necessary which could eventually prevent 30 frames per second video at the User A display. There is a need for improving bus utilization in a video processing application. There is also a need for providing 30 frames per second video processing applications. Without such data throughput speed, video images tend to look choppy in that a user can detect changes between video frames that are otherwise undetectable in a 30 frames per second environment.

SUMMARY OF THE INVENTION

The method and apparatus of the present invention provide improved video processing. According to an embodiment of the present invention, the video processing system comprises a video subsystem adapted to be coupled to a bus and a graphics subsystem. The video subsystem is adapted to generate first and second fields of video data. The video subsystem is adapted to transmit the first field of video data to the graphics subsystem via a port connection and the second field of video data to the bus.

DETAILED DESCRIPTION

Figure 1:
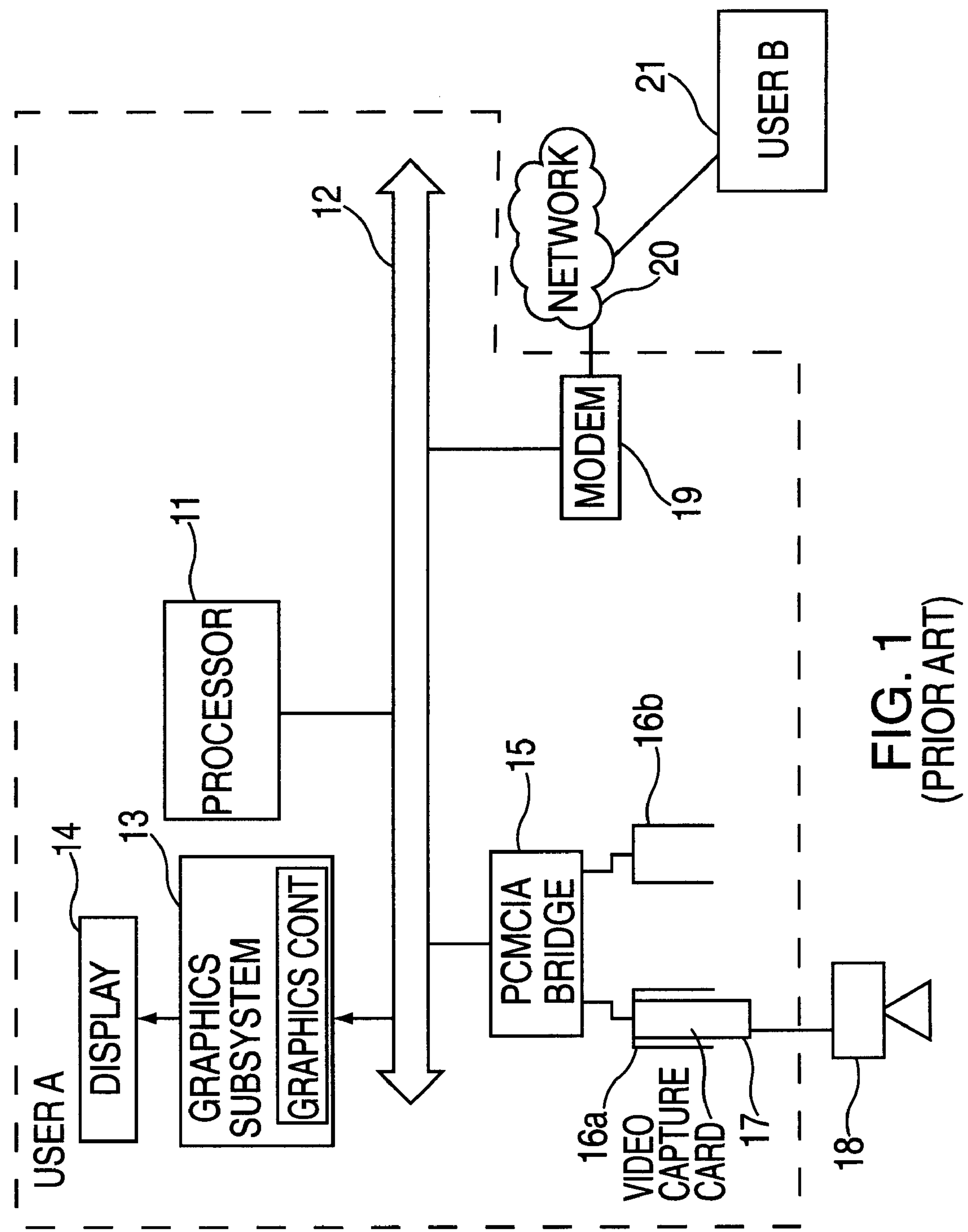
FIG. 1 is a block diagram of a video conferencing system as is known in the art
Figure 2:
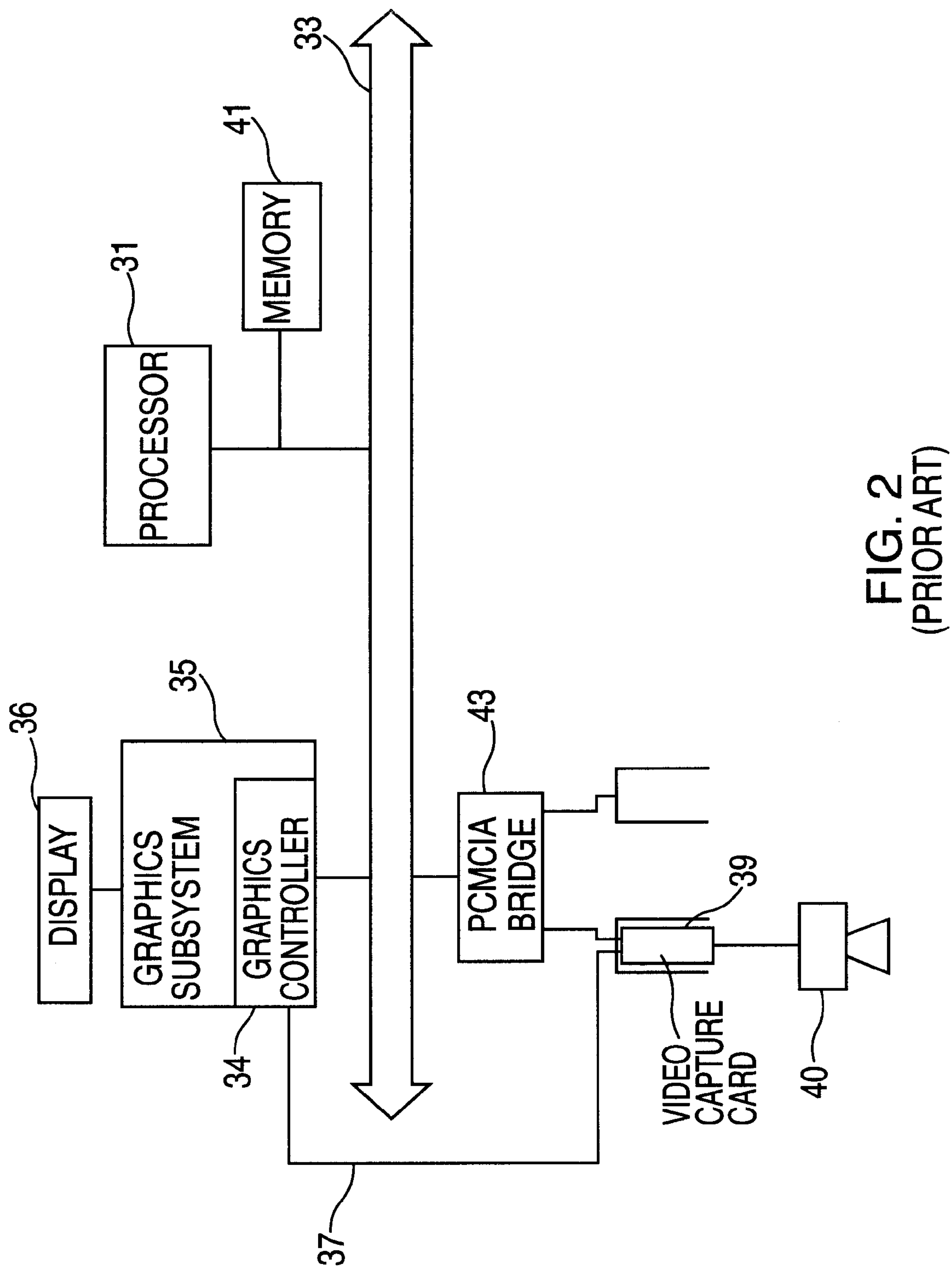
FIG. 2 is a block diagram of a video conferencing system using a Zoom Video standard as is known in the art.
Figure 3:
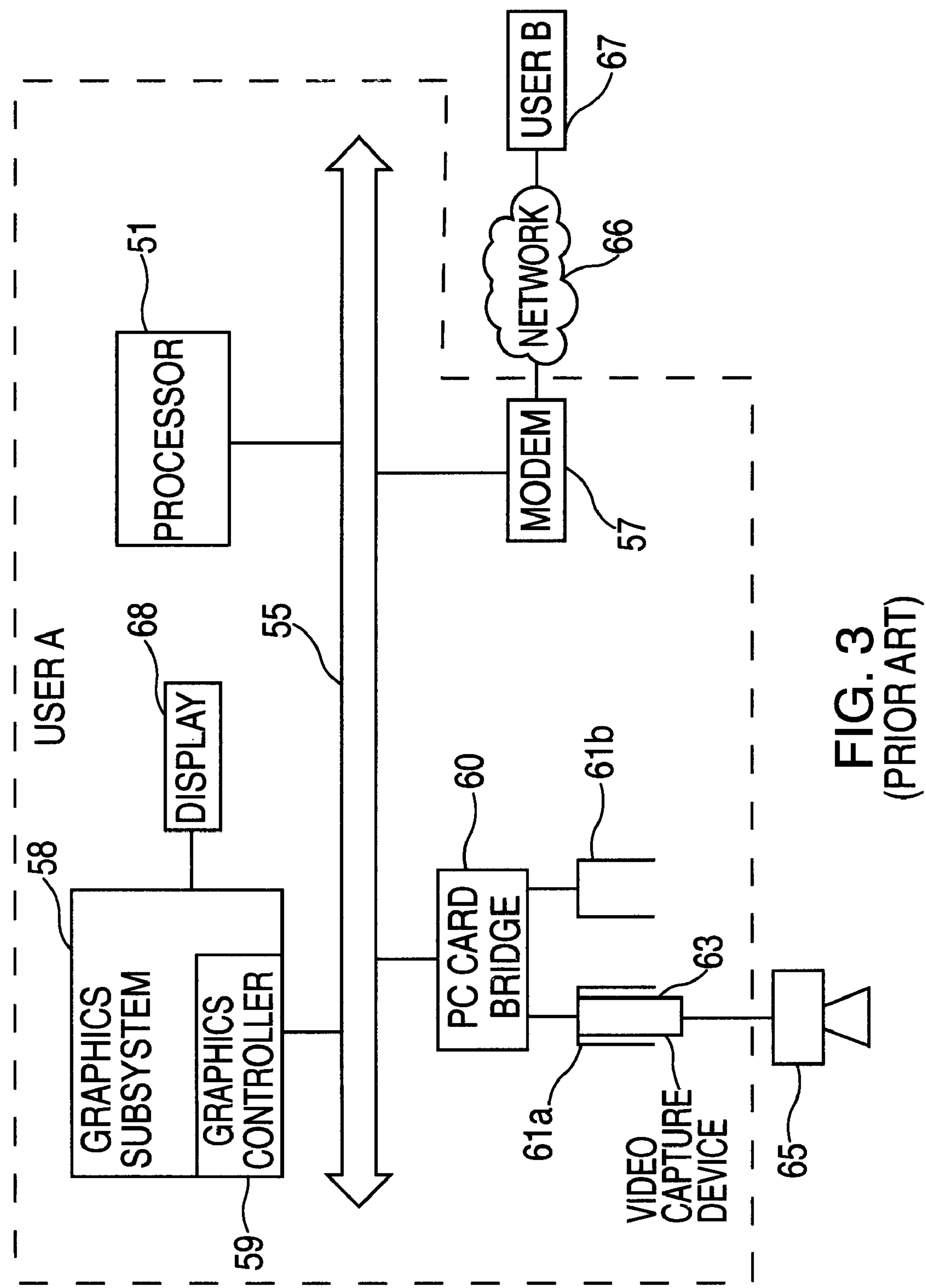
FIG. 3 is a block diagram of a video conferencing system using a PC Card bridge interface as is known in the art.
Figure 4:
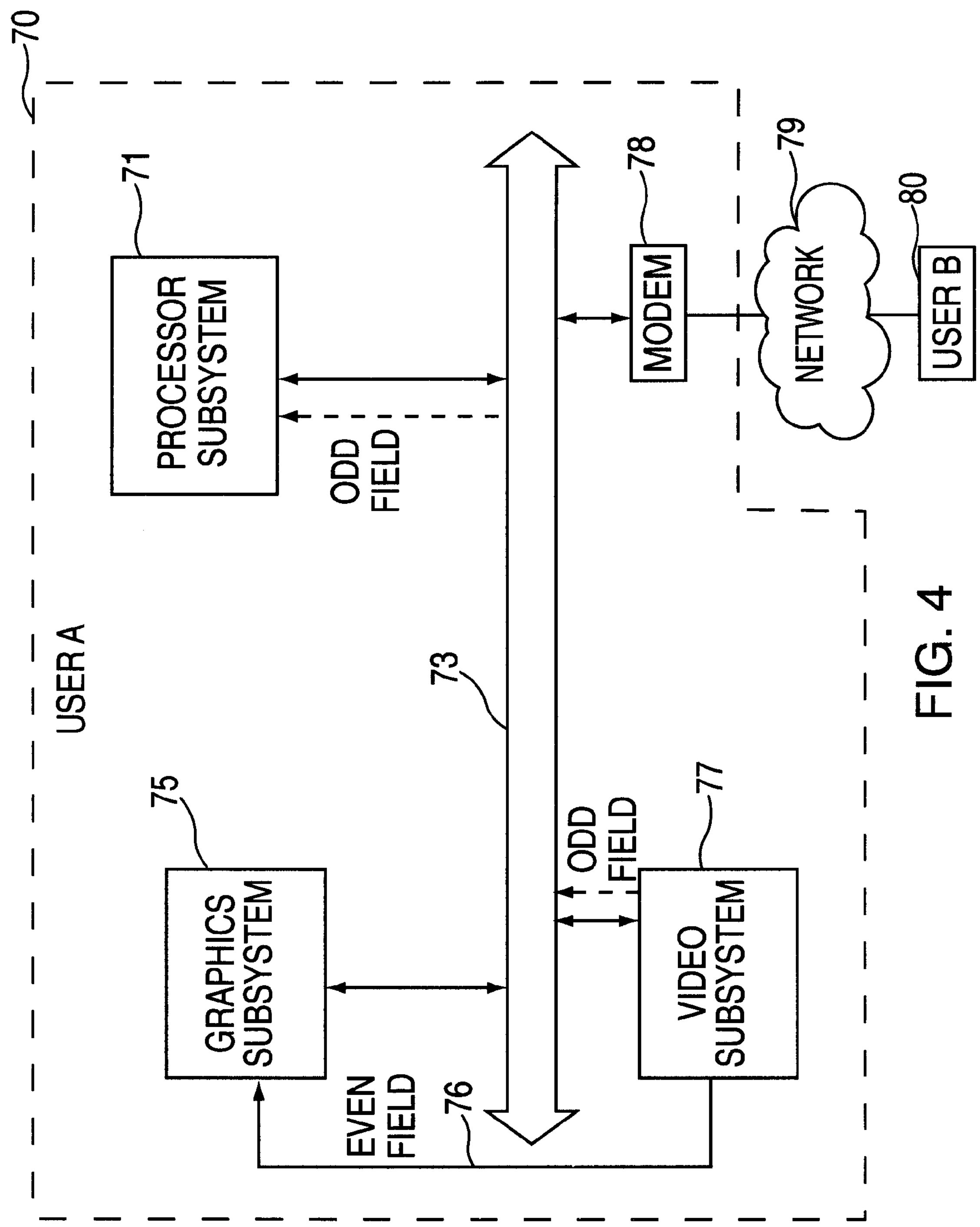
FIG. 4 is a block diagram of a video image processing system constructed and operating according to an embodiment of the present invention.

Referring to FIG. 4, block diagram of a video image processing system constructed and operating according to an embodiment of the present invention is shown. The system includes a processor subsystem 71, a video subsystem 77, and a graphics subsystem 75. In this embodiment, each of these components is coupled together via a bus (e.g., operating according to the PCI specification). Video subsystem 77 is also separately coupled to graphics subsystem via side band connection 76. In this example of the present invention, video subsystem 77 generates a frame of video data as first and second fields (e.g., an odd field and an even field). The even field is transferred to the graphics subsystem 75 via side band connection 76 and can then be displayed to the user (e.g. User A 70) if desired. The odd field is transferred to bus 73 and can then be sent to processor subsystem 71 (shown in FIG. 4 with a dashed line) or to modem 78.

Preferably, the odd field is sent to processor subsystem 71 where it is compressed using any of a variety of known compression methods such as H.261 or H.263 standards. The compressed video image data can then be sent over bus 73 to modem 78 for transmission over a network 79 (e.g., the Internet network) to a comparable video image processing system at User B 80. Likewise, compressed video image data can then be sent from User B 80 over network 79 to modem 78 and then to processor subsystem 71 over bus 73. Processor subsystem 71 then decompresses the video image data from User B and transmits the data over bus 73 to graphics subsystem 75 where it can be displayed to the user.

In transferring video image data to and from User B and displaying video data from User B and video subsystem 77, only four accesses to bus 73 are needed The first is to transfer video image data to the processor subsystem 71 from the video subsystem 77 for compression. The second is for the transmission of the compressed video image data to the modem 78 from the processor subsystem 71. The third is for the transmission of compressed video image data from modem 78 to processor subsystem 71. The fourth is the transfer of decompressed video image data from processor subsystem 71 to graphics subsystem 75. Accordingly, savings are seen in the need for processor execution cycles and bus access cycles. This is because processor subsystem 71 is not needed to convert video image data generated by video subsystem 77 and transmit that converted data over bus 73 to graphics subsystem 75 for display.

Figure 5:
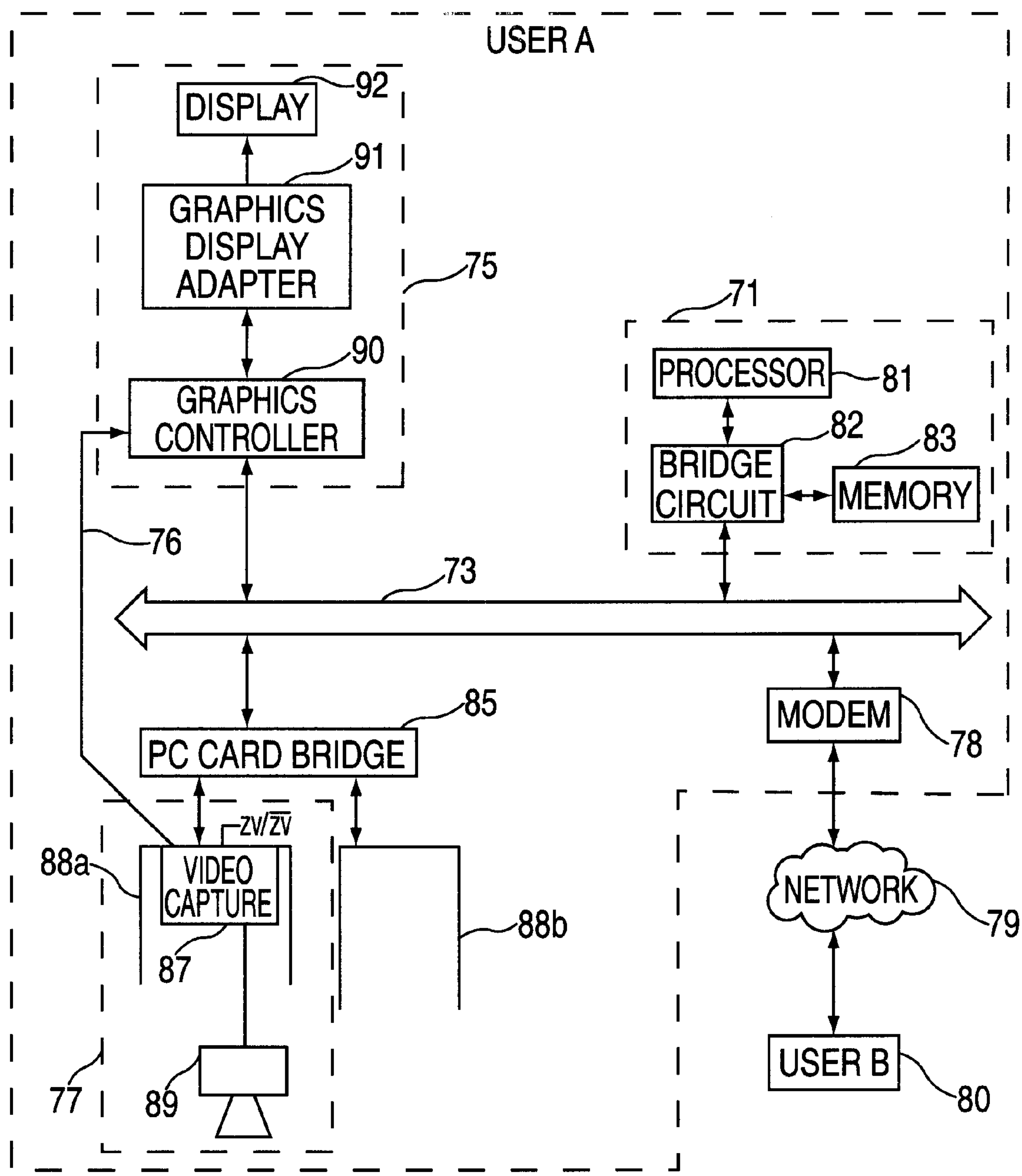
FIG. 5 is an example of the system shown in FIG. 4.

Referring to FIG. 5, a block diagram of an example of the video processing system of FIG. 4 is shown. Processor subsystem 71 includes a processor 81, such as a PENTIUM® processor which is coupled to bus 73 via a bridge circuit 82. An example of a bridge circuit is the 82430FX PCI chipset manufactured by Intel Corporation. Coupled to bridge circuit 82 is a memory 83 (e.g., Random Access Memory—RAM) that stores executable instructions, data and the like. In this example, bus 73 operates according to the PCI standard. Video subsystem 77 is coupled to bus 73 via a PC Card bridge circuit 85. Video subsystem 77 comprises a video capture card 87, such as the Noteworthy Cardbus video capture card discussed above, coupled to video source, such as a video cassette recorder (VCR), a video compact disc—read only memory (CD-ROM), etc. In this example, the video source is a camera 89. Video capture card 87 is coupled to bus 73 via a slot 88_a_ coupled to PC Card Bridge circuit 85. In this example, PC Card Bridge 85 operates according to the Cardbus standard as an interface between video capture card 87 and PCI bus 73. Graphics subsystem 75 comprises a graphics controller 90 which is coupled to bus 73. Graphics controller 90 is further coupled to video capture card 87 via port 76. A graphics display adapter 91 is provided coupled between graphics controller 90 and display 92.

In this example, port 76 which couples graphics controller 90 to video capture card 87 is a Zoom Video port as described above. As is known in the art, video capture cards and graphics controllers are typically controlled by a processor through the execution of device driver software. In this example, video capture card 87 is controlled by the execution of device driver software (e.g., stored in memory 83) by processor 81. Through this, video capture card 87 may be set into a first mode (e.g., a "Zoom Video transfer" mode; ZV) or a second mode (e.g., a "Cardbus transfer" mode; $\overline{ZV}$). Also, graphics controller 90 can be controlled by the execution of device driver software by processor 81 to accept video data in a first mode (e.g., the "Zoom Video transfer" mode from video capture card 87) or a second mode (e.g., from bus 73).

In operation, video capture card 87 generates a first (e.g., "even") field of video image data. In response, the execution of device driver software causes video capture card 87 to go into the first mode (e.g., "Zoom Video transfer" mode) of operation and transfer the first field of video image data to graphics controller 90 over Zoom Video port 76. Video Capture card 87 may tri-state the connection to PC Card bridge 85 so that the first field of video image data is not transmitted to bus 73. Graphics controller 90 receives the first field of video image data and can output the image directly to display 92 via graphics display adapter 91. In a video conferencing application, the first field of video image data may represent a video image of the user (e.g., "User A"). When a second field of video image data is generated by video capture card 87, the execution of device driver software causes video capture card 87 to transfer the second field of video image data to PC Card bridge 85 for transmission to processor 81 via bus 73. Preferably, the second field of video image data also represents a video image of "User A."

One skilled in the art will appreciate that the first and second fields of video image data need not be complete images. For example, a field of video image data could be a single raster line of data. Also, the first and second fields of video image data need not be successive. For example, several "first" fields of video image data can be generated and transmitted to graphics controller 90 over port 76 before a "second" field of video image data is sent to processor subsystem 71 over bus 73. Furthermore, the first and second fields of video image data need not be odd and even (or even and odd) fields, respectively. Video image data from an odd and even field can be sent to graphics subsystem 75 as a first field and then an odd and even field can be sent to processor subsystem 71 as a second field, for example. When a video image is displayed at a resolution of greater than 320 by 240 pixels, odd and even fields tend to be used for such a display. Doing so, however, would lower the display rate of video image data to 15 frames per second if video subsystem 77 generates video image data at 30 frames per second. In addition, depending on the operation speed of video subsystem 77, the first and second fields of video image data can be the same data. For example, video subsystem 77 could send an odd field as the first field of video image data to graphics subsystem 75 and then send the same odd field as a second field of video image data to processor subsystem 71.

Processor subsystem 71 receives the second field of data and compresses it for transfer over modem 78 to User B 80 via network 79. Likewise, processor subsystem 71 receives compressed video image data from User B via modem 78 so that it can be decompressed and transmitted to display 92 via bus 73, graphics controller 90, and graphics display adapter 91. In a video conferencing application, this compressed video image data preferably represents the video image of "User B."

With the video processing systems of FIGS. 4 and 5, several advantages are achieved. First, as stated above, fewer accesses to bus 73 are needed and processor execution time is saved by transmitting the first filed of video image data to the graphics controller 90 via port 76. Also, the video data from video subsystem 77 that is displayed at display 92 can be high-quality, 30 fields per second video. Furthermore, in the specific embodiment of FIG. 5, a Noteworthy Cardbus video capture card (modified as described above) can be combined with the Zoom Video transmission standard to provide improved video processing.

Figure 6:
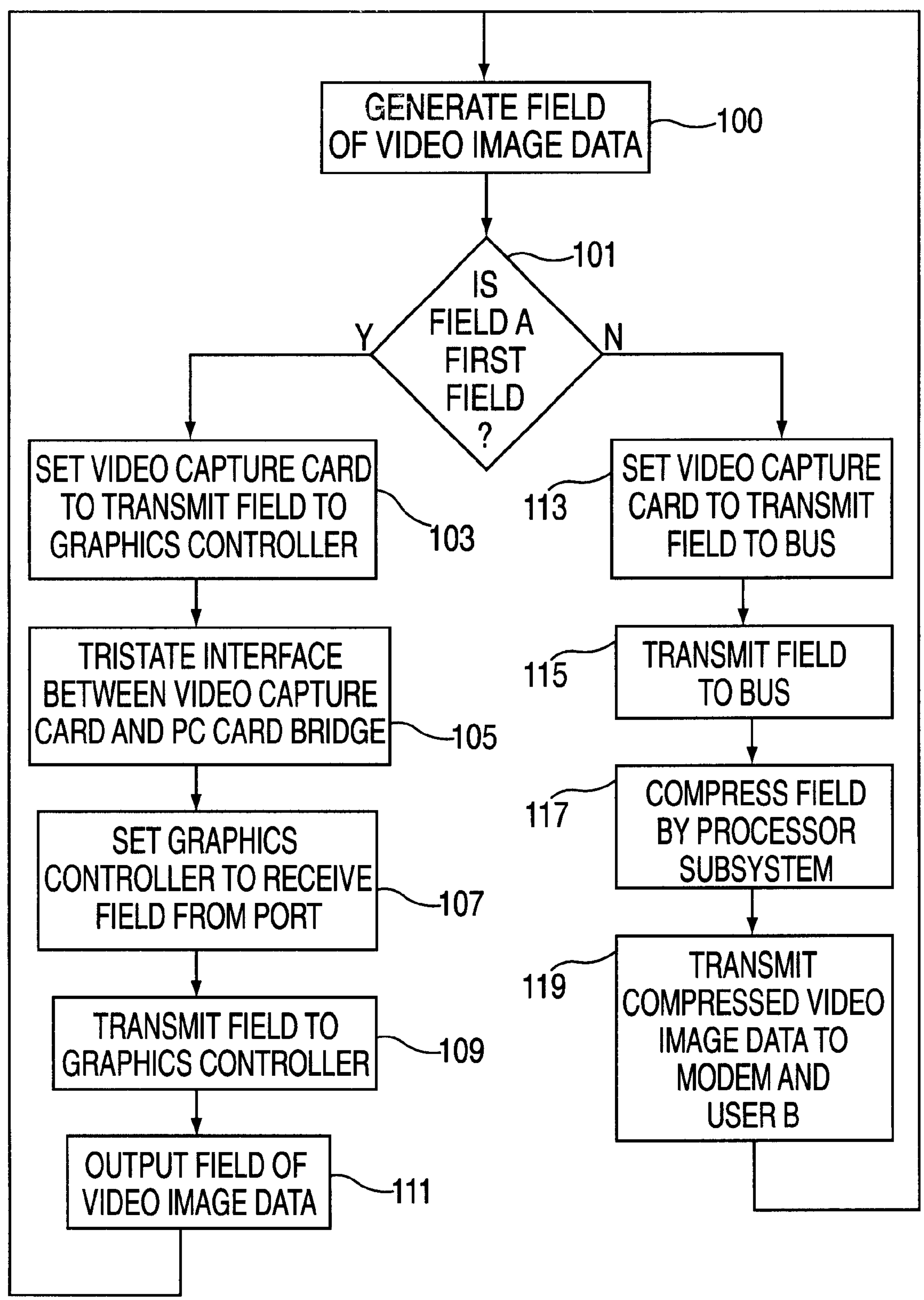
FIG. 6 is a flowchart of method processing video data according to an embodiment of the present invention.

Referring to FIG. 6, a flowchart for an embodiment of the method of the present invention is shown. In step 100, a field of video data is generated (e.g., at video capture card 87 in FIG. 5). In decision block 101, it is determined whether a first type or second type of field has been generated (e.g., an odd or even field). If the field is a first field then the video capture card is set via the device drive to transmit the field to the graphics controller (step 103). Also, the interface to the bus is tri-stated in the video capture card so as to prevent data from being transmitted onto the bus (step 105). Once skilled in the art will appreciate that such data can be transmitted onto the bus if desired. In step 107, the graphics controller is set (e.g., by a suitable device driver) to receive the field of video data from the video capture card from the appropriate port. In step 109, the first field (e.g., the even field) is transmitted to the graphics controller (e.g., from video capture card 87 to graphics controller 90 via Zoom Video port 76 in FIG. 5). In step 111, the first field of video image data is output to the display (e.g., display 92 in FIG. 5).

If the field is not a first field (e.g., it is an odd field), the video capture card is set (e.g., through a device driver) to transmit the field to the bus (step 113). In step 115, the second field is transferred to the bus (e.g., to a processor subsystem). With respect to a video phone or video conferencing application, the field of video data can be compressed by the processor subsystem (step 117) and transmitted to a modem or other similar device for transmission to a remote user (step 119).

Although several embodiments are specifically illustrated and described herein, it will be appreciated that modifications and variations of the present invention are covered by the above teachings and within the purview of the appended claims without departing from the spirit and intended scope of the invention. For example, although the present invention has been described with respect to the use of a modem and a network (elements 78 and 79 in FIG. 5), the present invention has applicability in other communication networks such as Local Area Networks (LANs), Wide Area Networks (WANs) and the like. Also, although the present invention has been described with respect to Zoom Video and PC Card/Cardbus standards, it has applicability using video subsystems and graphics subsystems employing other standards.

What is claimed is:

1. A video processing system comprising:

a video subsystem adapted to be coupled directly to a graphics subsystem by a first communication path and coupled to a bus by a second communication path, said video subsystem adapted to generate first and second fields of at least one frame of video data, said video subsystem adapted to transmit said first field of video data to said graphics subsystem via said first communication path and transmit said second field of video data to said bus via said second communication path.

2. The video processing system of claim 1 wherein said video subsystem includes a video capture device adapted to generate said first and second fields of video data.

3. The video processing system of claim 2 wherein said video subsystem further includes a video source coupled to said video capture device.

4. The video processing system of claim 2 further comprising:

a graphics subsystem including a graphics controller coupled to said video subsystem via a port connection.

5. The video processing system of claim 3 further comprising:

a graphics subsystem including a graphics controller coupled to said video capture device via a port connection.

6. The video processing system of claim 4 further comprising:

a bus coupled to said graphics subsystem and said video subsystem; and a processor subsystem coupled to said bus and adapted to receive said second field of video data from said video subsystem.

7. The video processing system of claim 5 further comprising:

a processor subsystem coupled to said bus and adapted to receive said second field of video data from said video subsystem.

8. The video processing system of claim 7 wherein said bus operates according to the Peripheral Component Interconnect (PCI) and said video subsystem transmits said second field of video data to said PCI bus via a Cardbus interface.

9. The video processing system of claim 8 wherein said port connection between said video subsystem and said graphics subsystem is a Zoom Video port connection.

10. A video conferencing system comprising:

a graphics subsystem including a display;

a bus;

a processor subsystem coupled to said bus;

a video subsystem coupled directly to said graphics subsystem by a first communication path and coupled to said bus by a second communication path, said video subsystem adapted to generated first and second fields of at least one frame of video data, said video subsystem adapted to transmit said first field of video data to said graphics subsystem for display via said first communication path and said second field of video data to said processor subsystem via said bus; and a modem coupled to said bus and adapted to receive compressed video data from said processor subsystem, said modem adapted to transmit said compressed video data to a remote user.

11. The video processing system of claim 10 wherein said video subsystem includes a video capture device adapted to generate said first and second fields of video data.

12. The video processing system of claim 11 wherein said video subsystem further includes a camera coupled to said video capture device.

13. The video processing system of claim 11 wherein said graphics subsystem includes a graphics controller coupled to said video subsystem via a port connection.

14. The video processing system of claim 12 wherein said graphics subsystem includes a graphics controller coupled to said video capture device via a port connection.

15. The video processing system of claim 13 further comprising:

a processor subsystem coupled to said bus and adapted to receive said second field of video data from said video subsystem.

16. The video processing system of claim 14 further comprising:

a processor subsystem coupled to said bus and adapted to receive said second field of video data from said video subsystem.

17. The video processing system of claim 16 wherein said bus operates according to the Peripheral Component Interconnect (PCI) and said video subsystem transmits said second field of video data to said PCI bus via a Cardbus interface.

18. The video processing system of claim 17 wherein said port connection between said video subsystem and said graphics subsystem is a Zoom Video port connection.

19. A method of processing video data comprising:

generating a first field of at least one frame of video image data in a video subsystem;

transmitting said first field of video image data directly from said video subsystem to a graphics subsystem via a first communication path;

generating a second field of said at least one frame of video image data in a video subsystem; and transmitting said second field of video image data to a bus coupled to said video subsystem via a second communcation path.

20. The method of claim 19 wherein said video subsystem includes a video capture device, the method further comprising:

setting said video capture device to send video data to said graphics subsystem via said first port connection when said video capture device generates a first field of video image data.

21. The method of claim 20 wherein said graphics subsystem includes a graphics controller, the method further comprising:

setting said graphics controller to receive said video image data from said port connection after said video capture device generates the first field of video image data.

22. The method of claim 21 further comprising:

receiving said second field of video image data from said bus by a processor subsystem.

23. The method of claim 22 further comprising:

compressing said second field of video image data from said bus by said processor subsystem.

24. The method of claim 23 further comprising:

transmitting compress ed video image data from said processor subsystem to a remote user over a network.

* * * * *